US006976615B2

(12) United States Patent  (10) Patent No.: US 6,976,615 B2
Dean  (45) Date of Patent: Dec. 20, 2005

(54) VEHICLE LOAD CARRIER

(75) Inventor: Gregory A. Dean, McKinleyville, CA (US)

(73) Assignee: Yakima Products, Inc., Beaverton, OR (US)

( * ) Notice: Subject to any disclaimer, the term of this patent is extended or adjusted under 35 U.S.C. 154(b) by 0 days.

(21) Appl. No.: 10/163,258

(22) Filed: Jun. 3, 2002

(65) Prior Publication Data

US 2003/0057245 A1    Mar. 27, 2003

Related U.S. Application Data

(60) Provisional application No. 60/298,213, filed on Jun. 12, 2001.

(51) Int. Cl.⁷ ................................................ B60R 7/00
(52) U.S. Cl. .................... 224/405; 224/499; 224/506; 224/519; 224/524
(58) Field of Search ................................ 224/405, 502, 224/504, 505, 506, 507, 508, 519, 521, 523, 224/524, 529, 553, 495, 497, 499, 924, 917.5, 224/325, 315, 323; 296/26.03, 26.08, 26.09, 296/26.12, 26.13; 403/108, 109.6, 155, 156, 403/161–163, 320, 379.2, 379.3, 408.1, 297, 403/315–317; 411/352, 353, 999, 970, 553; 70/282, DIG. 57

(56) References Cited

U.S. PATENT DOCUMENTS 4,383,628 A * 5/1983 Hiller ......................... 224/325
4,813,584 A * 3/1989 Wiley .......................... 224/521
5,228,656 A * 7/1993 Sauber ......................... 248/201
5,330,084 A * 7/1994 Peters .......................... 224/519
5,615,904 A * 4/1997 Van Dusen et al. .......... 224/521
5,662,444 A * 9/1997 Schmidt, Jr. ................. 411/353
5,676,292 A * 10/1997 Miller .......................... 224/524
5,752,636 A * 5/1998 Manley ........................ 224/405
5,775,560 A * 7/1998 Zahn et al. ................... 224/524
5,845,828 A * 12/1998 Settelmayer ................. 224/321
5,850,959 A * 12/1998 Miller .......................... 224/521
6,105,841 A * 8/2000 Aftanas ........................ 224/321
6,526,789 B1 * 3/2003 Edgerly et al. ................ 70/232

* cited by examiner

Primary Examiner—Stephen K. Cronin
(74) Attorney, Agent, or Firm—Kolisch Hartwell, P.C.

(57) ABSTRACT

A vehicle load carrier including a frame adapted to support a load and mount to the rear of a vehicle, wherein the frame includes coupling member for coupling with the rear of the vehicle and a carrier section. The load carrier includes a pivot joint having locking catches and a non-removable retainer adapted to engage the catches. The retainer may have a threaded portion adapted to engaged a threaded opening in the frame. The retainer engages the catches for securing the coupling member and carrier section in a fixed position relative to one another. The vehicle load carrier may also include a clamping mechanism configured to couple a transverse member and a cross bar member together, wherein the clamping mechanism has an opening to receive the cross bar member, and wherein the clamping mechanism is positioned substantially inside a cavity of the transverse member so that when the cross bar member is inserted into the cavity, the clamping mechanism clamps the cross bar member in a secure and fixed position relative to the transverse member.

19 Claims, 7 Drawing Sheets

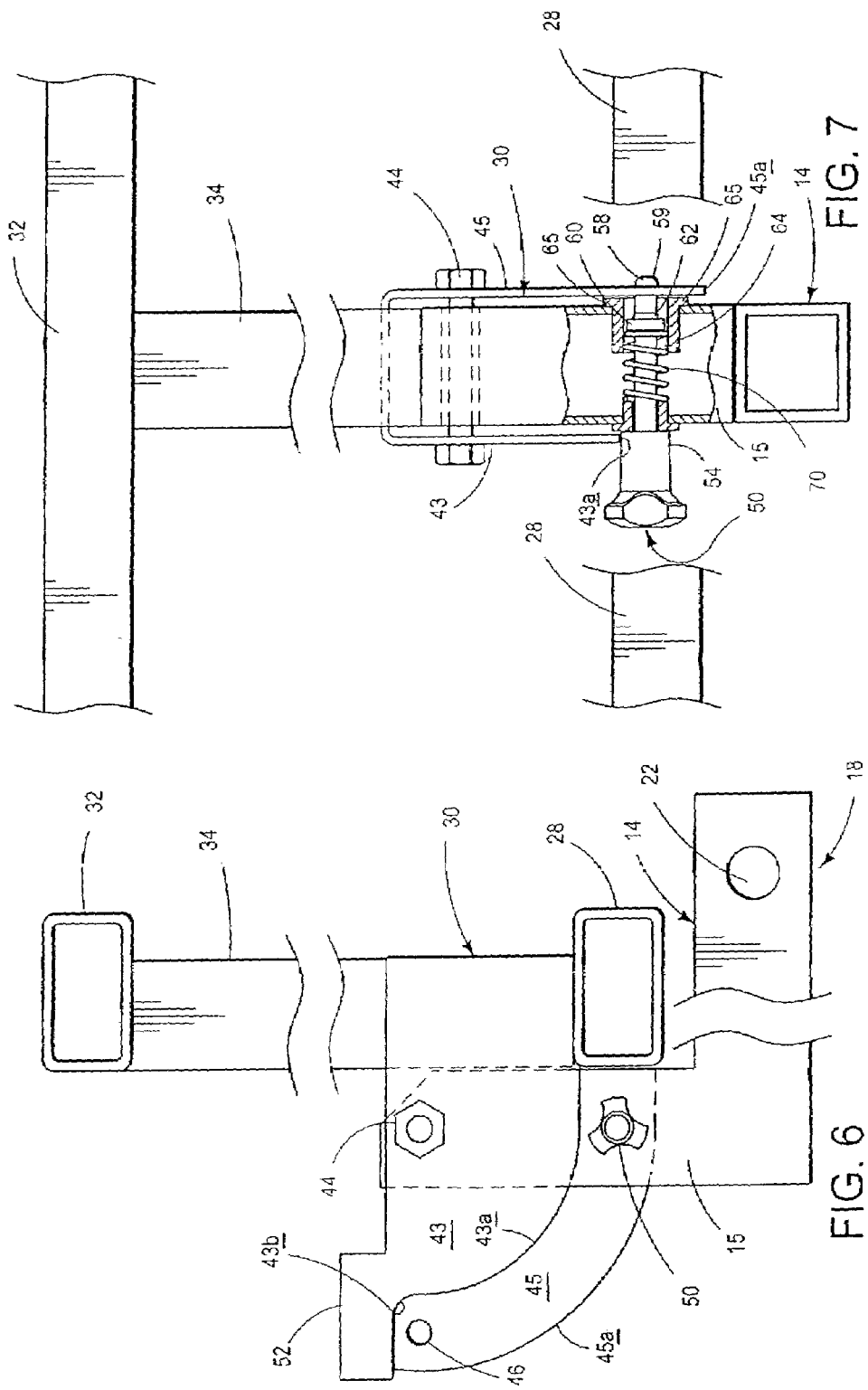

VEHICLE LOAD CARRIER

CROSS-REFERENCE TO RELATED APPLICATION(S)

This application claims the priority under 35 U.S.C. §119 and applicable foreign and international law of U.S. Provisional Patent Application Ser. No. 60/298,213 filed Jun. 12, 2001 which is hereby incorporated by reference in its entirety for all purposes.

FIELD OF THE INVENTION

The present invention relates generally to vehicle load carriers adapted for detachable mounting on a vehicle, and more particularly, to a hitch-mounted load carrier which includes a novel pivot joint and retainer for enabling the load carrier to be pivoted between stowed and deployed positions when mounted on a vehicle.

BACKGROUND AND SUMMARY OF THE INVENTION

Vehicle load carriers adapted for engagement to the exterior of a vehicle are well known, and provide a convenient way to transport recreational and sporting goods equipment, such as bicycles, skis, coolers, and similar gear. A common type of load carrier or rack attaches to the vehicle's receiver hitch and is supported thereon. These hitch-mounted load carriers may be a fixed structure that cannot be adjusted or moved once attached to the vehicle, and may inhibit access to the rear of the vehicle, especially if the carrier is loaded with bicycles or other equipment. In order for the trunk lid of a car or the lift gate of a sports utility vehicle to be opened, if it has a hitch-mounted load carrier, a person must first unhitch the load carrier and may have to remove it from the vehicle. A person now can gain access to the cargo area of the vehicle, by lifting the trunk lid or lift gate, as the case may be. The load carrier can then be remounted and trunk lid or lift gate, as the case may be. The load carrier can then be remounted and secured to the vehicle after the trunk lid or lift gate is closed. If the load carrier has equipment attached to it, this process is even more cumbersome because the equipment must be unloaded before removing the load carrier, and then reloaded after the load carrier has been remounted to the hitch. Another disadvantage of a fixed structure load carrier is that it cannot be adjusted to a more compact size when it is transported without a load. The load carrier increases the overall length of the vehicle making it difficult for the user to back up safely, park, maneuver in traffic, etc.

In an attempt to alleviate these disadvantages, hitch-mounted load carriers have been developed which are adjustable to allow the main structure of the load carrier to move to allow access to the rear opening of a vehicle or to minimize the space used by the load carrier when its cargo is unloaded. Some load carriers have a pivot allowing the main structure of the load carrier to pivot downwardly and away from the rear of the vehicle, while other carriers pivot to the side of the vehicle, and still others slide to the rear, away from the vehicle. Another type of adjustable load carrier has individual components that are either adjustable or interchangeable with other sizes or types of members to enable a person to customize the size of the carrier.

Such load carriers may have a fastening mechanism, such as a pin fastener, to secure the components of the load carrier in a fixed position by inserting the pin fastener into openings in the load carrier designed to receive them. Conventional pin fasteners may become lost or misplaced. If a person loses or misplaces the pin fastener the load carrier cannot then be locked in a fixed position. Another problem with pin fasteners and other fastening mechanisms is that they may not fit securely into the openings thereby allowing the members to vibrate noisily against each other when the vehicle is driven. The motion of the pin fastener may cause it to repeatedly rub and wear against the boundary of the opening and enlarge it causing an even noisier connection.

The present invention provides a hitch-mounted load carrier with a unique pivot joint, which pivotally interconnects two portions of the load carrier, a first coupling member adapted to be mounted on a vehicle and a second carrier section. The pivot joint enables the carrier section to be selectively pivoted or swung between deployed and stowed positions. A non-removable retainer, such as a pin member, is selectively positionable to lock the pivot joint so that the coupling member and carrier section are locked from pivoting relative to one another when the carrier section is in either the deployed or stowed position. The retainer may be readily extended by hand to lock the carrier section to the coupling member or manually retracted to release the pivot joint without being removed.

The advantages of the present invention will be understood more readily after a consideration of the drawings and the detailed description.

BRIEF DESCRIPTION OF THE DRAWINGS

FIG. 6 is a sectioned side view of the pivoting hitch-mounted load carrier of FIG. 1, in the stowed configuration.

FIG. 7 is a partial end view of the pivot joint of the load carrier of FIG. 1, shown stowed as in FIG. 6.

DETAILED DESCRIPTION OF THE PREFERRED EMBODIMENTS

Figure 1:
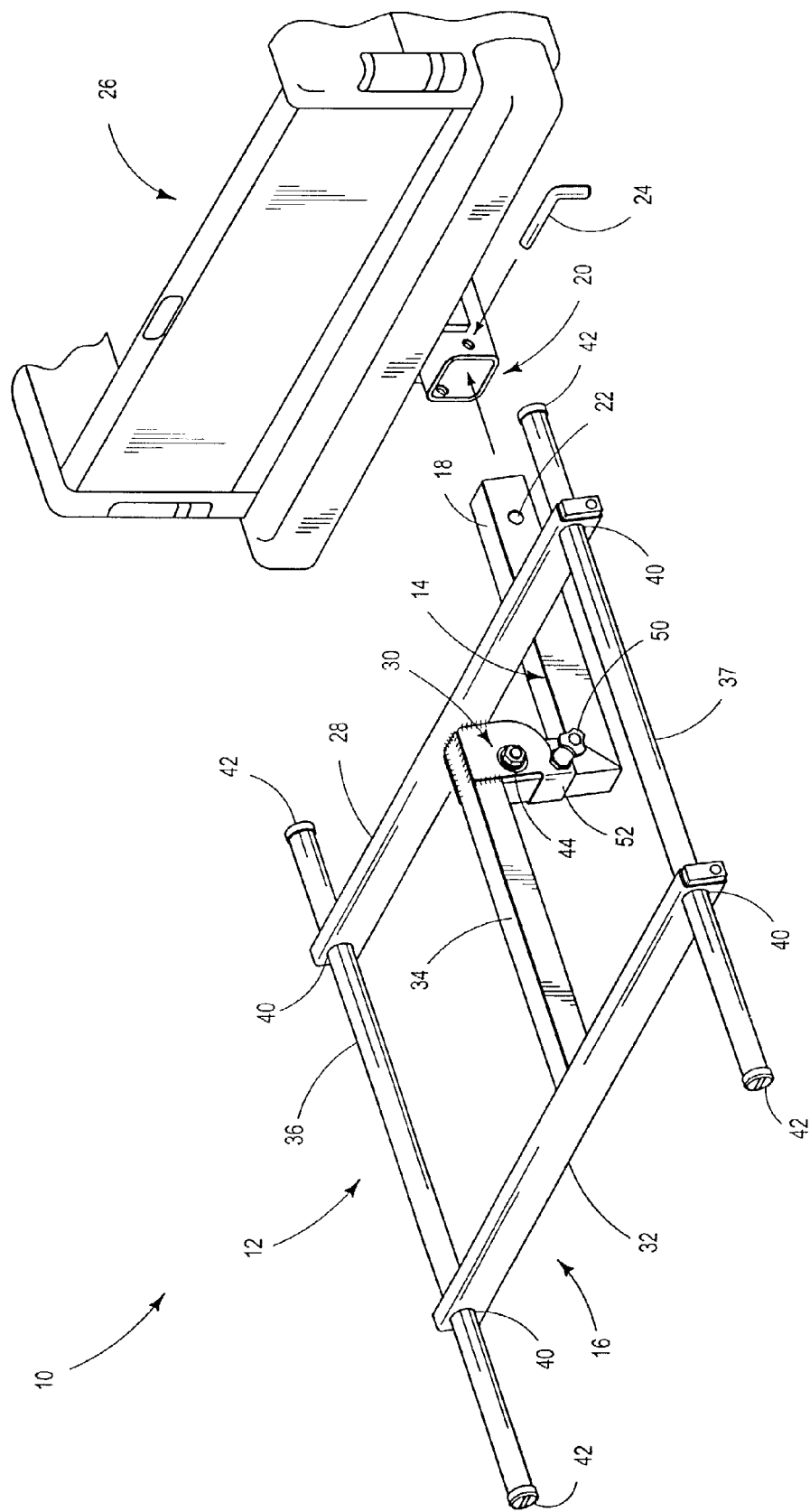
FIG. 1 is an isometric view of a hitch-mounted load carrier provided with a pivot joint interconnecting a coupling member and a carrier section according to the present invention, shown in context at the rear of a vehicle.

A hitch-mountable load carrier according to an embodiment of the present invention is shown in FIG. 1, generally indicated at 10, and includes a frame 12 having a first coupling member 14, connected to a carrier section generally indicated at 16. Coupling member 14 is tubular in form, and includes a mounting end 18 adapted for insertion into a receiver-type hitch 20 extending from the rear end of a vehicle 26. Mounting end 18 includes conventional hitch pin apertures 22 for receiving a pin structure 24 to secure load carrier 10 to the rear of vehicle 26. To secure load carrier 10 to the vehicle, mounting end 18 is inserted into hitch 20, hitch pin apertures 22 are aligned with corresponding apertures in hitch 20 and pin structure 24 is inserted through the apertures in the hitch and apertures 22 to thereby secure load carrier 10 to the rear of the vehicle.

In accordance with the present invention, a pivot joint 30, as shown in FIG. 1, interconnects coupling member 14 and carrier section 16. Pivot joint 30 and a non-removable retainer associated therewith (to be described) permits coupling member 14 and carrier section 16 to be rotated or pivoted relative to one another, so that the carrier section is positioned in either a stowed or deployed position. When in the stowed position carrier section 16 is substantially vertical and when in the deployed position section 16 is substantially horizontal. FIG. 1 shows carrier section 16 pivoted downwardly and locked into its deployed position. Carrier section 16 includes spaced-apart first and second transverse members 28 and 32, respectively. First transverse member 28 is suitably connected by welding, mechanical fasteners, or other suitable means, to pivot joint 30. A connecter bar 34 is similarly secured to pivot joint 30 at one end thereof and its other end is secured to second transverse member 32.

Carrier section 16 includes laterally-opposed crossbars 36 and 37 inserted into suitable openings 40 provided in transverse members 28 and 32. Openings 40 are positioned near each end of the transverse members and carrier section 16 is defined by the interconnection of the crossbars and transverse members. Crossbars 36 and 37 are cylindrical in form and designed to support a variety of specialty equipment attachments for load carriers, such as bicycle mounts, ski mounts, cargo boxes, or cargo baskets, etc. End caps 42 are placed over the ends of the crossbars to provide a relatively blunt surface.

Figure 3:
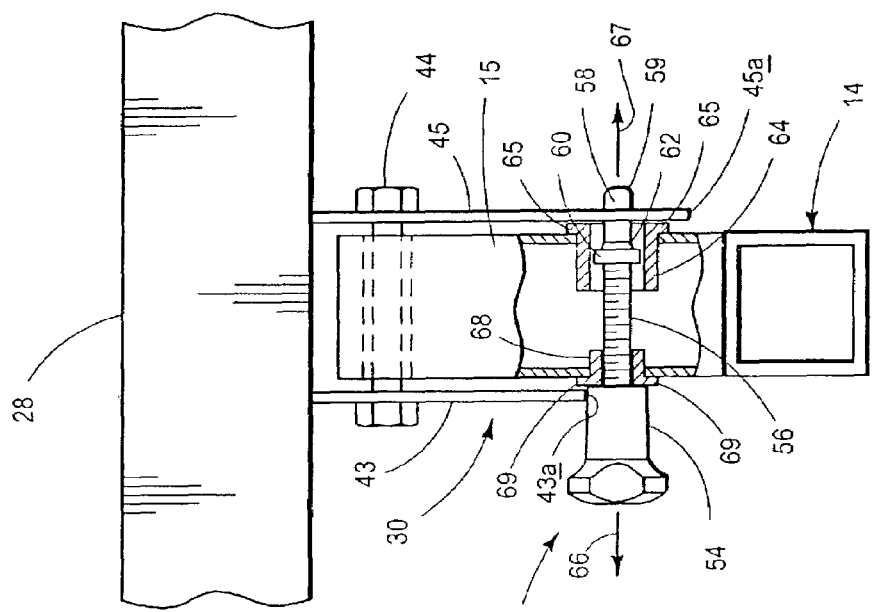
FIG. 3 is a partial end view of the pivot joint of the load carrier of FIG. 1, shown deployed as in FIG. 2.
Figure 2:
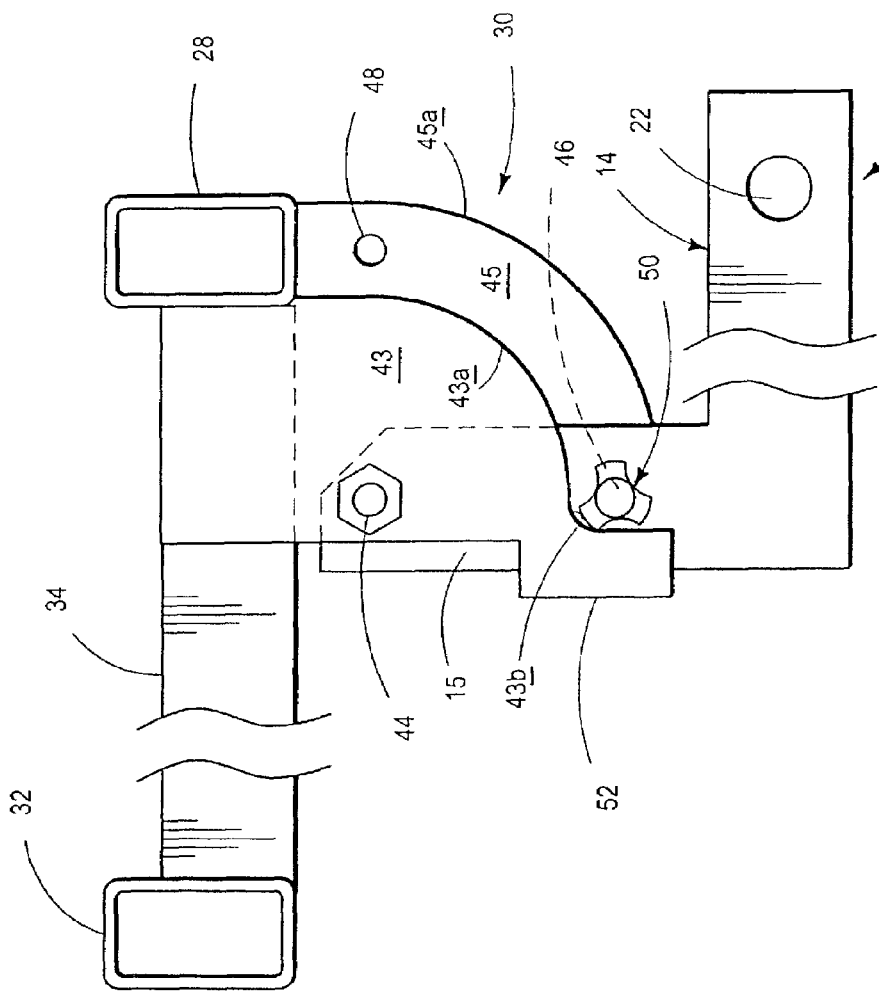
FIG. 2 is a partially sectioned side view of the pivoting hitch-mounted load carrier of FIG. 1, in the deployed configuration.
Figure 5:
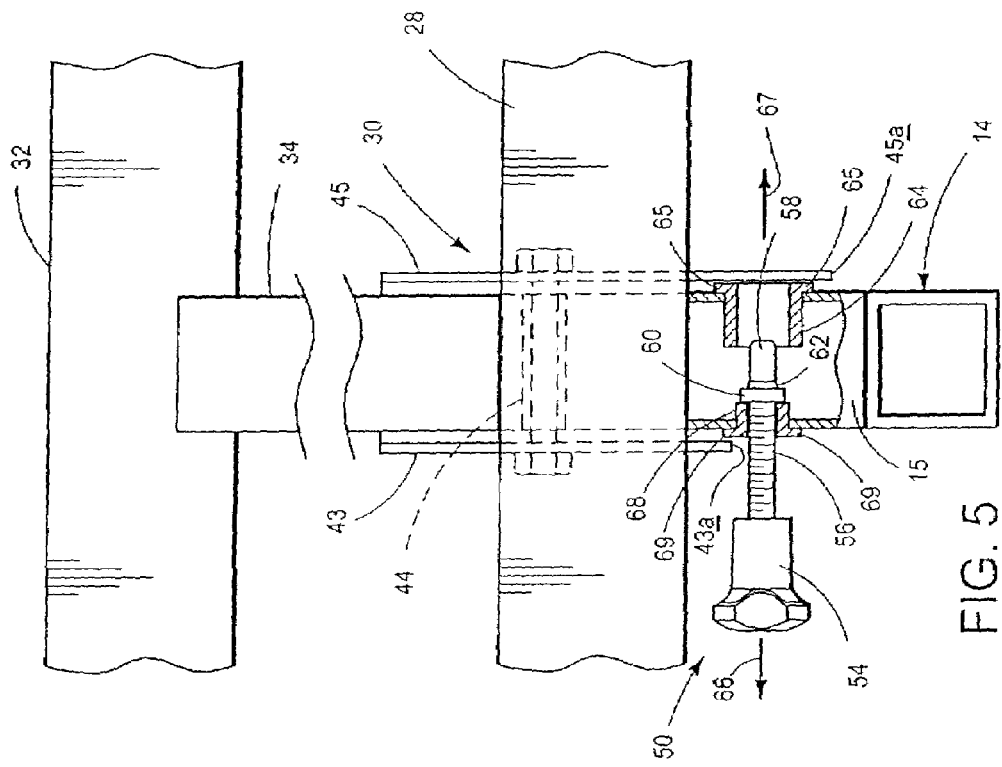
FIG. 5 is a partial end view of the pivot joint of the load carrier of FIG. 1, shown in between the deployed configuration and the stowed configuration as in FIG. 4.
Figure 4:
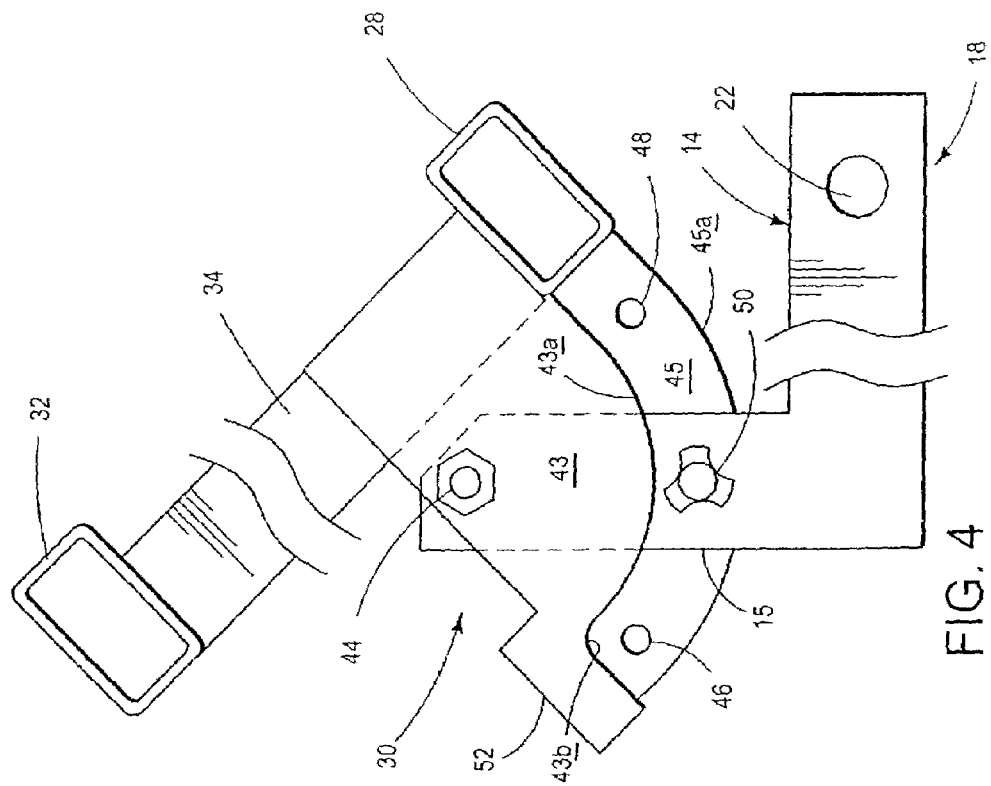
FIG. 4 is a partially sectioned side view of the pivoting hitch-mounted load carrier of FIG. 1, shown in between the deployed configuration and the stowed configuration.

As mentioned at the outset, the present invention is directed to a novel pivot joint and retainer which enables the carrier section to be pivoted relative to the coupling member and locked in either the stowed or deployed positions. As shown in FIGS. 2 and 3, pivot joint 30 is formed with a pair of spaced-apart side walls, 43 and 45, which receive a tubular upright 15 extending vertically from coupling member 14. A pivot bolt 44 pivotally mounts pivot joint 30 to coupling member 14, as shown in FIGS. 3, 5, and 7. Pivot bolt 44 extends through side walls 43 and 45 and upright 15. A cross piece or pivot stop 52, as shown in FIGS. 1 and 2, interconnects side walls 43 and 45, and spans across tubular section 15 to provide a stop to limit the extent to which carrier section 16 can be pivoted downwardly. Pivot stop 52 prevents carrier section 16 from rotating downwardly beyond where the carrier section is substantially horizontal, because the pivot stop is configured to engage upright 15 as shown in FIG. 2. Side wall 45 includes a locking catch 46 for securing the load carrier in the deployed position and locking catch 48 for securing it in the stowed position, as will be described.

A non-removable retainer 50 is shown in detail in FIGS. 3, 5, and 7. As shown in FIG. 3, the retainer takes the form of an elongate member such as a pin member having portions which extend through apertures provided in opposed walls of upright 15, and is operable manually for selective extension into and retraction from either locking catch 46 or 48, thereby to lock the carrier section in the deployed or stowed positions respectively as will be explained. In a first embodiment, retainer 50 includes a handle 54, a threaded shank 56, a non-threaded end portion 58 having rounded edges 59, and a circular collar 60 which transitions with a beveled portion 62 to end portion 58. Handle 54 is mounted at one end of retainer 50 outside of tubular upright 15, and collar 60 prevents removal of the retainer by abutting the end of a threaded insert 68 as shown in FIG. 5. Collar 60 is positioned between the ends of retainer 50 so that when the retainer is withdrawn, as shown in FIG. 5, non-threaded end portion 58 disengages from either locking catch 46 or 48.

Upright 15 of coupling member 14 further includes a guide sleeve 64 opposite threaded insert 68, which is adapted to receive and align retainer 50 when it is extended to engage locking catches 46 and 48. Guide sleeve 64 is provided with a cap 65, which enables the guide sleeve to be inserted into a suitable opening in a wall of upright 15, and retained in that position. When non-threaded end portion 58 of retainer 50 is inserted through either locking catch 46 or 48 of pivot joint 30, the retainer prevents pivot joint 30 from rotating relative to upright 15 and coupling member 14, thereby securing carrier section 16 in either the deployed or stowed position.

As shown in FIG. 2, side wall 43 of pivot joint 30 is configured with an arcuate edge 43a which transitions into another recurved edge 43b to fit around retainer handle 54, so that the side wall does not contact the handle or retainer when the pivot joint is pivoted. Arcuate edge 43a is offset inwardly (as seen in FIG. 2) from arcuate edge 45a of side wall 45, which must locate the locking catches to be aligned with the longitudinal axis of retainer 50, when carrier section 16 is to be locked in either the deployed or stowed positions. With the offset orientation of side walls 43 and 45, pivot joint 30 may rotate about bolt 44 without requiring that retainer 50 be removed from upright 15 of coupling member 14. Side wall 43 does not overlap that portion of upright 15 which receives retainer 50, whereas side wall 45 is dimensioned so that it will overlap the portion of upright 15 which receives retainer 50 so that end portion 58 can be extended through upright section 15 for insertion into either locking catch 46 or 48.

Locking catch 46 is located on side wall 45 to align with retainer 50 when carrier section 16 is in its deployed position, whereas locking catch 48 is located on side wall 45 to align with retainer 50 when carrier section 16 is pivoted to its folded or stowed position. Retainer 50 may extend into engagement with either locking catch when aligned therewith, to secure the pivot joint in a locked configuration preventing rotation of the carrier section relative to the coupling member. While edges 43a and 45a are shown arcuate in form, that shape is not necessary. The important feature is that the side walls have at least portions which are offset, as described above.

In FIGS. 3 and 5, an arrow 66 illustrates the direction that retainer 50 must move to disengage from a locking catch, and arrow 67 shows reengagement of retainer 50 with a locking catch. Rotation in a first direction of retainer handle 54 causes threaded shank 56 to extend to the right, as indicated by arrow 67, to engage either locking catch 46 or 48. Rotation of handle 54 in the opposite direction causes retainer 50 to be retracted or urged away from a locking catch as indicated by arrow 66. Retraction causes end portion 58 to disengage from either locking catch 46 or 48, to thereby unlock pivot joint 30, so that carrier section 16 can be pivoted between the deployed and stowed positions. In one example, rotating retainer handle 54 clockwise causes threaded shank 56 to move the retainer in the direction of arrow 67 and counterclockwise rotation causes the retainer to move in the direction of arrow 66.

In a second embodiment, as shown in FIG. 7, a biasing structure 70, such as a coil spring, could replace use of threaded shank 56 and threaded insert 68. To disengage retainer 50 from pivot joint 30, a person need only pull handle 54 in the direction of arrow 66, which compresses biasing structure 70 and disengages end portion 58 from either locking catch 46 or 48. It should be understood that biasing structure 70 may include a coil spring, as shown, an elastomer, or any other suitable resilient structure capable of biasing non-removable fastening retainer 50 into engagement with either of the locking catches.

Figure 3A:
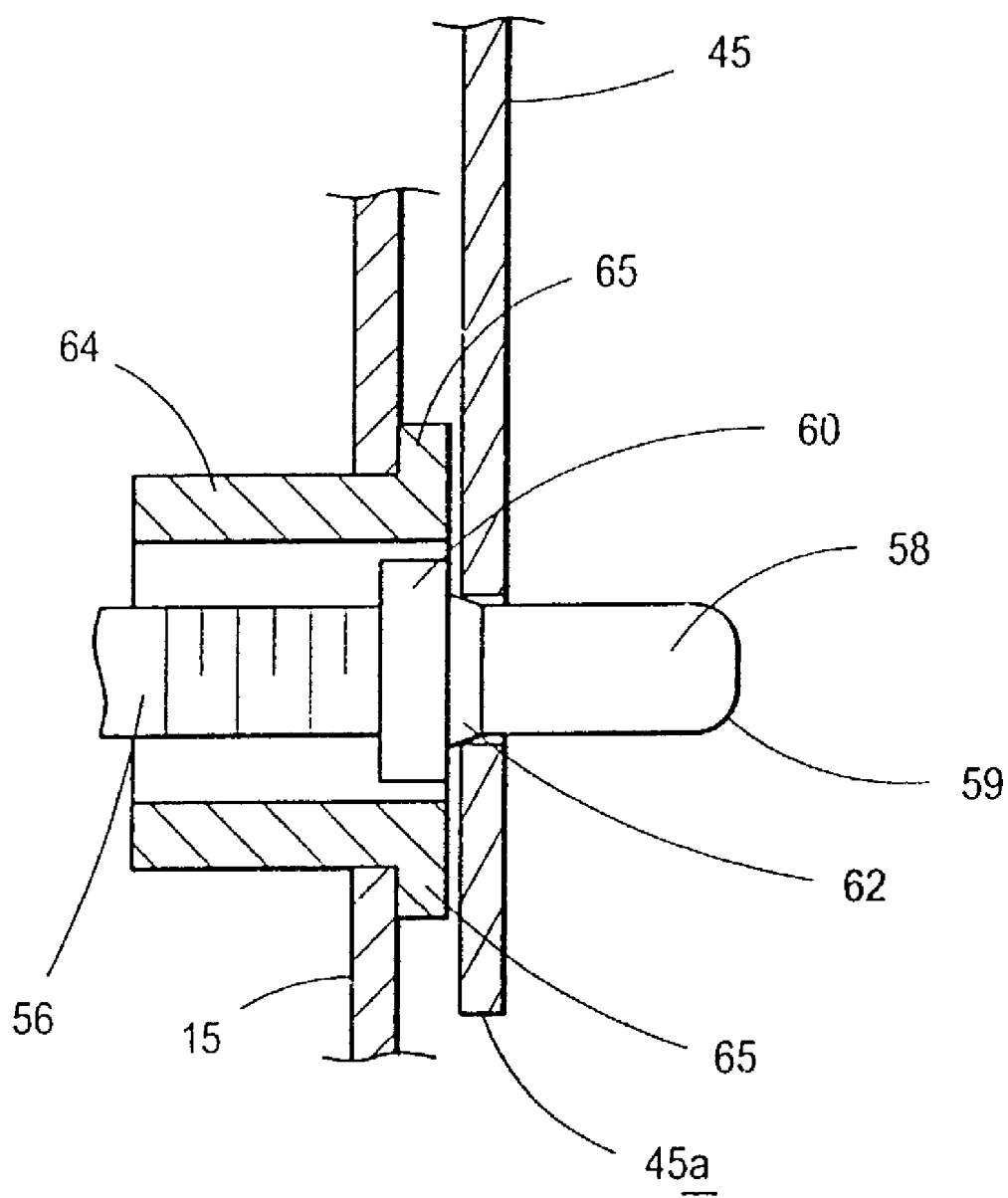
FIG. 3A is a partial view of a sectioned portion of the pivot joint of FIG. 3, showing a retainer engaging a locking catch in the pivot joint.

A feature of the present invention resides in provision of beveled portion 62, which enables the retainer to snugly engage with the opening of either locking catch 46 or 48 when the retainer is fully extended into locking position. For example, as shown in FIG. 3A, extension of retainer 50 causes beveled portion 62 to engage the edge of the opening of a locking catch in a relatively tight friction fit preventing carrier section 16 from rattling against upright 15 and the retainer. This fit prevents retainer 50 from vibrating and impacting against a locking catch, thereby helping avoid noise, premature wear and possible fatigue. As retainer 50 is extended to engage a locking catch, collar 60 travels along guide sleeve 64, to keep the retainer in the proper alignment, and guide beveled portion 62 to frictionally engage the edge of the opening of a locking catch. Both the threaded shank and the biasing structure would urge end portion 58 to extend through either locking catch, causing the beveled portion to seat at least partially in the locking catch, as shown in FIG. 3A.

A person can mount load carrier 10 to a vehicle hitch in the deployed position, but of course may mount it in the stowed position if desired. The carrier section can then be loaded with sports or recreation equipment for transport to some destination where it will be unloaded. A vehicle is easier to park with the load carrier in the stowed position, so after unloading, a user can move carrier section 16 from its deployed position to the stowed position. By first retracting retainer 50 from locking catch 46, to release pivot joint 30 and thereby permit carrier section 16 to pivot upwardly. Pivot joint 30 is relocked in the stowed position by extending retainer 50 into locking catch 48. A person may reverse this process redeploying and reloading carrier section 16 for further transport.

In the first embodiment, where retainer 50 includes threaded shank 56, a person may easily retract the retainer by rotating handle 54 counter-clockwise, until non-threaded end portion 58 is withdrawn completely from locking catch 46 and moves inwardly so that side wall 45 will be free to swing by upright 15 when the carrier section is pivoted. One may extend the retainer to lock the pivot joint by rotating handle 54 clockwise, until end portion 58 engages locking catch 48. If retainer 50 is constructed in accordance with the second embodiment (FIG. 7) where biasing member 70 urges the retainer toward a locking catch, a person retracts the retainer by pulling handle 54 until end portion 58 disengages from the locking catch. When the carrier section is oriented in either the stowed or deployed position, handle 54 is released upon alignment of retainer 50 with a locking catch to permit the biasing member to urge the retainer into engagement with the selected locking catch.

Figure 8:
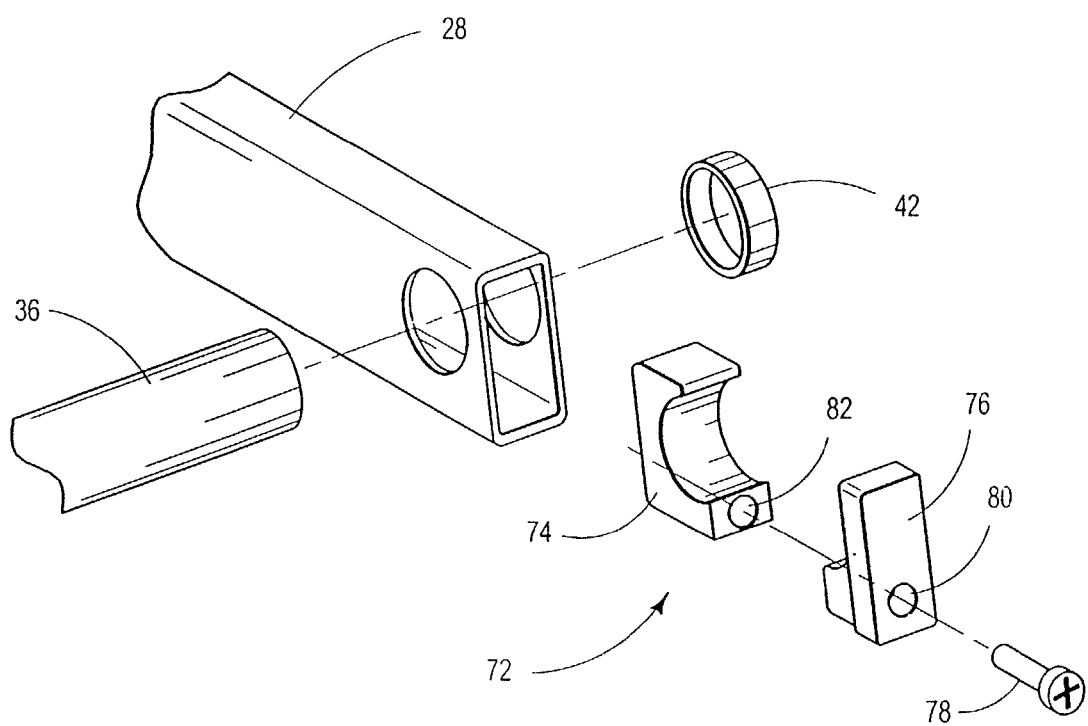
FIG. 8 is an assembly isometric view of the cross bar clamping mechanism of the load carrier of FIG. 1.

A clamping mechanism 72 is shown in FIG. 8 which clamps crossbars 36 and 37 in a fixed position relative to first and second transverse members 28 and 32. Clamping mechanism 72 includes clamping base 74, clamping top 76 and clamping screw 78. Clamping screw 78 passes through clamping-top opening 80 and engages clamping-screw threaded opening 82, which is positioned in clamping base 74. Transverse members 28 and 32 are adapted to receive clamping base 74 and substantially encloses the clamping base. To operate clamping mechanism 72, clamping base 74 is inserted into a cavity 84 in the end of transverse member 28 or 32 to a distance deep enough to permit crossbar 36 or 37 to be inserted into crossbar receiver opening 40 unobstructed. Then, crossbar 36 or 37 is inserted into receiver opening 40 and clamping top 76 is inserted into the end of transverse member 28 or 32, such that clamping base 74 and clamping top 76 substantially sandwich crossbar 36 or 37. Finally, clamping screw 78 is inserted through clamping top opening 80 and tightened into clamping-screw threaded opening 82. Clamping screw 74 is tightened until crossbar 36 or 37 can no longer slide in an axial direction relative to crossbar receiver opening 40.

Figure 9:
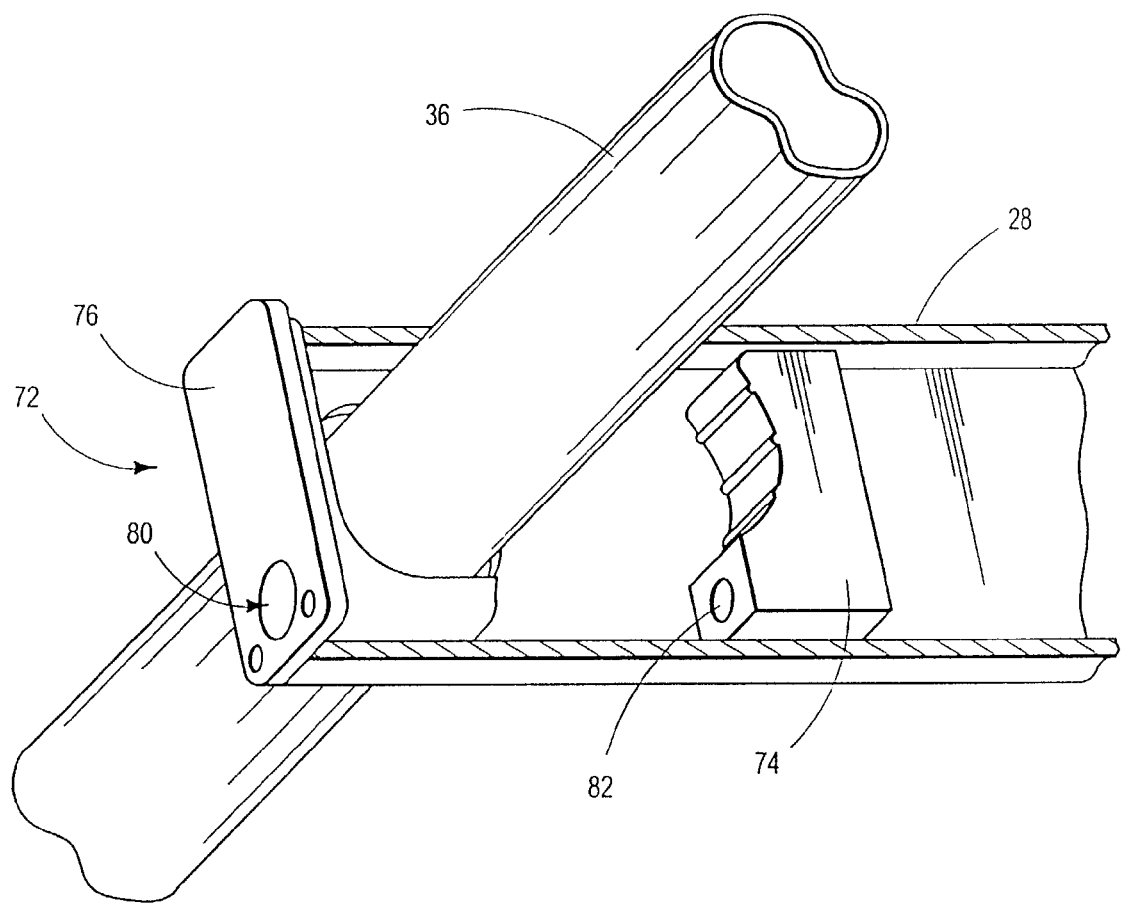
FIG. 9 is a partially cut away isometric view of the clamping mechanism of FIG. 8.

FIG. 9 further illustrates the operation of clamping mechanism 72. Crossbar 36 or 37 passes through crossbar receiver opening 40 in transverse member 28 and 32, shown partially cut away. As shown in FIG. 9, clamping base 74 is spaced apart from clamping top 76 to illustrate the operation of clamping mechanism 72. In operation, as described above, the clamping mechanism secures the cross bar and transverse member to form a generally rectangular rigid carrier section for vehicle load carrier 10.

The disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

The following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. A load carrier for mounting to the rear of a vehicle, comprising:
a load carrying frame mountable to the rear of a vehicle, wherein the frame includes a coupling member for connection to the vehicle and a carrier section for supporting a load;
a pivot joint including locking catches, wherein the pivot joint pivotally connects the coupling member to the carrier section for relative rotation between a stowed position and a deployed position;
a non-removable retainer configured for selectively engaging the locking catches to lock the pivot joint and the frame in either the stowed position or the deployed position, and disengagable from the locking catches to permit the pivot joint and the frame to be rotated between the stowed position and the deployed position, wherein the retainer is movable relative to the pivot joint for selective engagement or disengagement with the locking catches and includes a stop element mounted thereon configured for preventing the retainer from being removed from the frame, the retainer including an elongate member dimensioned to pass through the frame, and wherein the retainer is selectively shiftable laterally, a predetermined distance, for extension to engage the locking catches, and retraction to disengage the locking catches; and wherein the retainer is prevented from being removed from the frame when the stop element abuts an insert attached to the frame.

2. The load carrier of claim 1, wherein the insert has a threaded hole for receiving the retainer.

3. The load carrier of claim 1, wherein the insert includes a compressible biasing structure.

4. The load carrier of claim 1, wherein the stop element is positioned on the retainer intermediate its ends and spaced apart from the portion of the frame the stop element abuts a distance at least equal to the predetermined distance required for the retainer to disengage the locking catches.

5. The load carrier of claim 4, wherein the pivot joint includes spaced-apart first and second sides, the first side configured to permit the pivot joint and carrier section to rotate when the retainer is disengaged from the locking catches and wherein the locking catches are included on the second side.

6. The load carrier of claim 5, wherein the locking catches are positioned on the second side to receive the retainer when the carrier section is stowed in a substantially vertical position and when the load carrier is deployed in a substantially horizontal position.

7. The load carrier of claim 6, wherein a guide sleeve is attached to the frame for receiving the retainer, the guide sleeve being configured to substantially prevent the retainer from misalignment when the retainer is being extended toward the locking catches.

8. The load carrier of claim 7, including a threaded opening positioned on the frame, and wherein the retainer includes a threaded portion for engaging the threaded opening so the retainer can be extended or retracted.

9. The load carrier of claim 8, wherein the retainer includes a rotatable handle positioned outside the frame for rotating the retainer in a first direction to extend it into engagement with the locking catches and rotatable in a second direction to retract the from and disengage it from the locking catches.

10. The load carrier of claim 7, wherein the first side of the pivot joint includes an arcuate portion dimensioned to accommodate rotation of the pivot joint past the retainer.

11. The load carrier of claim 10, wherein the elongate member of the retainer is a pin.

12. The load carrier of claim 10, wherein a biasing member is coupled with the retainer for normally urging the retainer into engagement with the locking catches when the carrier section is positioned in either the stowed or deployed position.

13. The load carrier of claim 12, wherein retainer includes a handle positioned outside the frame, and wherein the biasing member includes a spring between the stop element and a portion of the frame adjacent the handle of the retainer.

14. A load carrier mountable to the rear of a vehicle, comprising:
a frame adapted to support a load and couple with the rear of a vehicle, wherein the frame includes plural transverse members, and plural cross bars, wherein the plural transverse members include openings positioned and sized to accommodate the cross bars; and
a clamping mechanism configured to couple the transverse members to the cross bars, wherein the clamping mechanism has an opening to receive the cross bars, and wherein the clamping mechanism is positioned substantially inside a cavity of the transverse member so that when the cross bar is inserted into the opening of the transverse member, the clamping mechanism clamps the cross bar in a secure and fixed position relative to the transverse member.

15. The load carrier of claim 14, wherein the frame includes a hitch attachment member for attaching the load carrier to a receiver-type trailer hitch.

16. The load carrier of claim 15, wherein the frame further comprises a carrier section, the hitch attachment member and the carrying section being pivotally connected so that the carrier section can pivot from a substantially horizontal position to a substantially vertical position.

17. The load carrier of claim 16, wherein the transverse member is a hollow tube.

18. A load carrier for mounting to the rear of a vehicle, comprising:
a load carrying frame mountable to the rear of a vehicle, wherein the frame includes a coupling member for connection to the vehicle and a carrier section;
a pivot joint including a first side, a second side and locking catches, wherein the pivot joint pivotally connects the coupling member and the carrier section for relative rotation between a stowed position, wherein the carrier section is substantially vertical, and a deployed position, wherein the carrier section is substantially horizontal, and wherein the locking catches are positioned on the second side;
a non-removable retainer includes an elongate member dimensioned to pass through the frame and configured for extension to selectively engage the locking catches to lock the pivot joint and the frame in either the stowed position or the deployed position, and disengagable from the locking catches to permit the pivot joint and the frame to be rotated between the stowed position and the deployed position, wherein the retainer includes a stop element configured to prevent the retainer from being removed from the frame; and
wherein the carrier section includes plural transverse members and plural cross bars the load carrier further comprises a clamping mechanism configured to couple the plural transverse members to the cross bars, wherein the transverse members each have an opening to receive one of the cross bars, and wherein the clamping mechanism is positioned substantially inside a cavity of the transverse member so that when the cross bar is inserted into the opening, the clamping mechanism clamps the cross bar in a secure and fixed position relative to the transverse member.

19. A load carrier for mounting to the rear of a vehicle, comprising:
a load carrying frame mountable to the rear of a vehicle, wherein the frame includes a coupling, member for connection to the vehicle and a carrier section for supporting a load;
a pivot joint including locking catches, wherein the pivot joint pivotally connects the coupling member to the carrier section for relative rotation between a stowed position and a deployed position;
a non-removable retainer configured for selectively engaging the locking catches to lock the pivot joint and the frame in either the stowed position or the deployed position, and disengagable from the locking catches to permit the pivot joint and the frame to be rotated between the stowed position and the deployed position, wherein the retainer is movable relative to the pivot joint for selective engagement or disengagement with the locking catches and includes a stop element mounted thereon configured for preventing the retainer from being removed from the frame, the retainer including an elongate member dimensioned to pass through the frame, and wherein the retainer is selectively shiftable laterally, a predetermined distance, for extension to engage the locking catches, and retraction to disengage the locking catches; and wherein the retainer is prevented from being removed from the frame when the stop element abuts a compressible biasing structure attached to the frame.

* * * * *